(12) United States Patent
Le Sage et al.

(10) Patent No.: US 8,184,050 B2
(45) Date of Patent: May 22, 2012

(54) ANTENNA ALIGNMENT AND MONITORING SYSTEM AND METHOD USING GNSS

(75) Inventors: Hendrikus A. Le Sage, Sprang Capelle (NL); Andrew J. Jakab, Calgary (CA)

(73) Assignee: Hemisphere GPS LLC, Calgary, Alberta (CA)

( * ) Notice: Subject to any disclaimer, the term of this patent is extended or adjusted under 35 U.S.C. 154(b) by 143 days.

(21) Appl. No.: 12/367,722

(22) Filed: Feb. 9, 2009

(65) Prior Publication Data
US 2009/0201203 A1    Aug. 13, 2009

Related U.S. Application Data

(60) Provisional application No. 61/027,477, filed on Feb. 10, 2008.

(51) Int. Cl.
*H01Q 3/00*    (2006.01)
*H04M 1/00*    (2006.01)

(52) U.S. Cl. ..................... 342/359; 455/562.1

(58) Field of Classification Search .......... 342/359; 455/562.1
See application file for complete search history.

(56) References Cited

U.S. PATENT DOCUMENTS

| | | | |
|---|---|---|---|
| 5,347,286 A * | 9/1994 | Babitch | 342/359 |
| 5,523,761 A | 6/1996 | Gildea | |
| 5,557,656 A * | 9/1996 | Ray et al. | 455/431 |
| 6,320,898 B1 * | 11/2001 | Newson et al. | 375/144 |
| 6,414,638 B1 | 7/2002 | Egashira | |
| 6,516,271 B2 | 2/2003 | Upadhyaya et al. | |
| 6,549,835 B2 | 4/2003 | Deguchi et al. | |
| 6,774,843 B2 | 8/2004 | Takahashi | |
| 6,822,314 B2 | 11/2004 | Beasom | |
| 6,897,328 B2 | 5/2005 | Gutsche et al. | |
| 6,897,828 B2 * | 5/2005 | Boucher | 343/890 |
| 6,999,042 B2 * | 2/2006 | Dearnley et al. | 343/890 |
| 7,006,032 B2 | 2/2006 | King et al. | |
| 7,089,099 B2 | 8/2006 | Shostak et al. | |
| 7,224,246 B2 | 5/2007 | Thomas | |
| 7,271,766 B2 | 9/2007 | Zimmerman et al. | |

(Continued)

FOREIGN PATENT DOCUMENTS

EP    0938190    8/1999

(Continued)

OTHER PUBLICATIONS

"RFS Product Preview", *RFS Product Brochure*, (Dec. 22, 2008),1 of 1.

(Continued)

*Primary Examiner* — Thomas Tarcza
*Assistant Examiner* — Cassie Galt
(74) *Attorney, Agent, or Firm* — Law Office of Mark Brown, LLC; Mark E. Brown

(57) ABSTRACT

An antenna alignment and monitoring system is provided for telecom antennas and includes a pair of global navigation satellite system (GNSS) antennas mounted on a printed circuit board (PCB) for installation in a telecom antenna enclosure. Multiple telecom antennas are configured in an antenna array for mounting on a transmission tower or other elevated structure. A common GNSS receiver cycles among the GNSS antenna pairs for initially aligning and subsequently monitoring the azimuth alignment of the telecom antennas relative to a reference azimuth using GNSS triangulation.

7 Claims, 3 Drawing Sheets

U.S. PATENT DOCUMENTS

| | | | |
|---|---|---|---|
| 7,298,325 B2 * | 11/2007 | Krikorian et al. | 342/359 |
| 7,718,941 B2 * | 5/2010 | Austin et al. | 250/203.4 |
| 2005/0174297 A1 | 8/2005 | Cake | |
| 2007/0285308 A1 | 12/2007 | Bauregger et al. | |
| 2010/0117914 A1 | 5/2010 | Feller et al. | |
| 2010/0211314 A1 | 8/2010 | Zhukov et al. | |
| 2010/0226354 A1 | 9/2010 | Duzdar et al. | |
| 2010/0231468 A1 | 9/2010 | Ogino et al. | |

FOREIGN PATENT DOCUMENTS

EP      938190 A2 *   8/1999

OTHER PUBLICATIONS

Richter, Paul H., et al., "Improved Blind Pointing of NASA's Beam-Waveguide Antennas for Millimeter Wave Operation", *Jet Propulsion Lab Technical Report Series 1992*. Published Apr. 4, 2000.

"International Search Report", PCT/US09/33567, (Feb. 9, 2009).

"International Search Report / Written Opinion", PCT/US09/63594, (Jan. 11, 2010).

"International Preliminary Report on Patentability", PCT/US2009/033567, (Apr. 7, 2009),1-8.

* cited by examiner

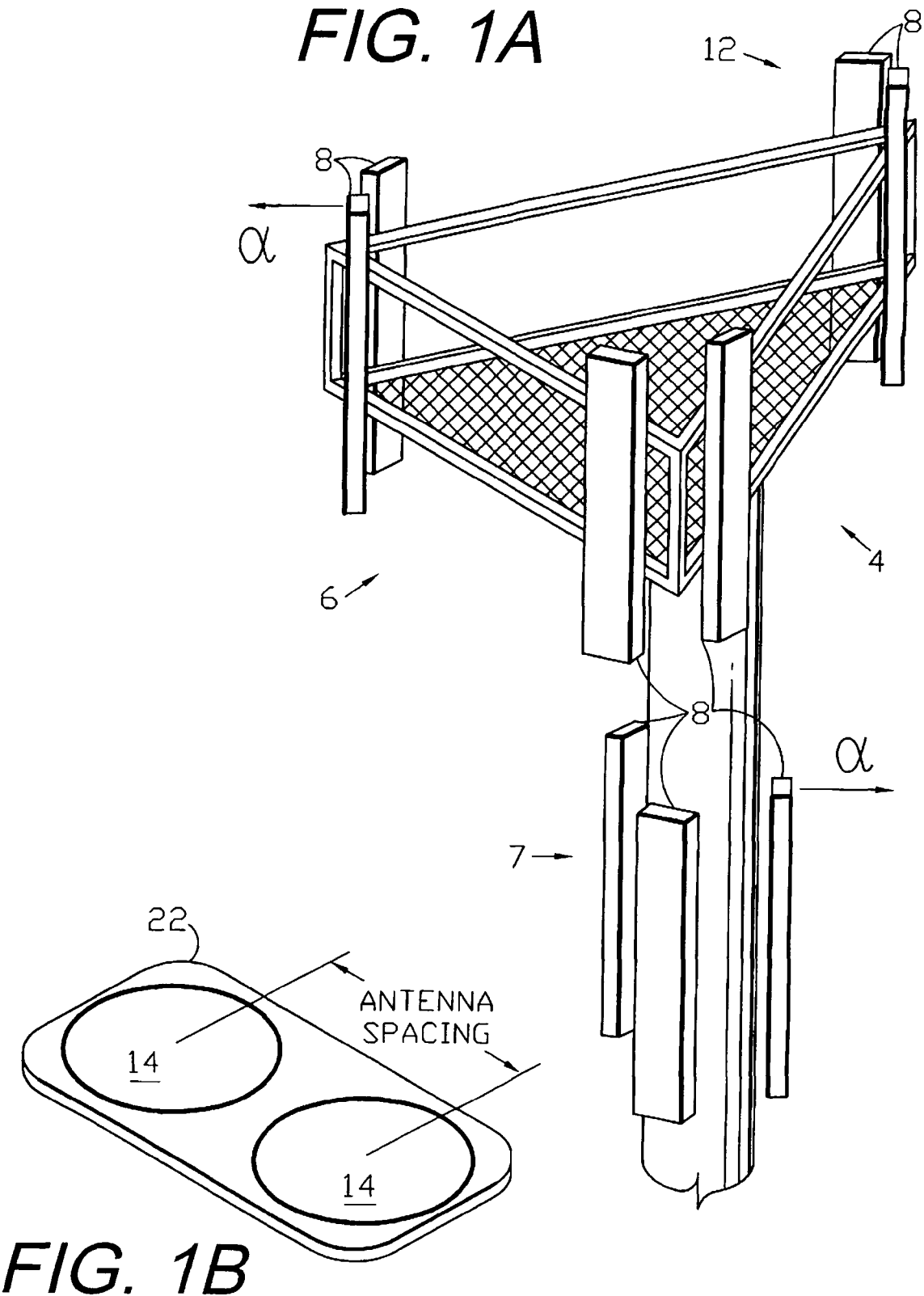

ANTENNA ALIGNMENT AND MONITORING SYSTEM AND METHOD USING GNSS

CROSS-REFERENCE TO RELATED APPLICATION

This application claims priority in U.S. Provisional Patent Application No. 61/027,477, filed Feb. 10, 2008, which is incorporated herein by reference.

BACKGROUND OF THE INVENTION

1. Field of the Invention

The present invention relates generally to antenna alignment and monitoring, and in particular to a system and method for antenna alignment and monitoring using global navigation satellite system (GNSS) signals.

2. Description of the Related Art

Wireless telecommunications, such as cellular, DCS, GSM, TDMA, CDMA, etc., use line-of-site antennas, which are commonly elevated on towers and mounted on tall buildings for maximizing coverage and range. Telecommunications antennas are typically directional, and require relatively precise directional alignment for optimal performance. For example, cellular telecommunications antenna systems typically include multiple, individual telecommunications antennas for transmitting and receiving. The antennas are commonly grouped in arrays or patterns configured for optimizing performance. Telecommunications antennas are commonly adjustable for both altitude (i.e., tilt in a vertical plane) and azimuth (i.e., alignment or "heading" in a horizontal plane).

Previously, cell tower antenna alignment was accomplished by rough approximation from ground level, e.g., by surveyors, followed by antenna-level fine alignment by skilled technicians using special equipment and techniques. Such previous antenna alignment procedures had a number of disadvantages. For example, they tended to be relatively expensive because the technicians were relatively highly-trained and the equipment was relatively sophisticated. Moreover, alignment technicians were required to ascend the towers and individually align the antennas one-by-one using iterative alignment-adjusting procedures, which tended to be time-consuming, particularly for installations with a number of antennas.

The Boucher U.S. Pat. No. 6,897,828 and U.S. Pat. No. 7,180,471 disclose another type of antenna alignment system and method using GNSS (GPS) receiver dishes mounted on frames, which in turn are temporarily mounted on the antennas for azimuth alignment. Multiple antennas in predetermined spaced relation can be used for computing azimuth by triangulating the GPS signals, or a single antenna can be moved from one location to another. However, the GPS receiver dishes and the aligning frames on which they are mounted must be relocated for aligning each separate antenna. Subsequent adjustments and realignments would require technicians to ascend the transmission towers for reattaching the alignment equipment to the individual antenna enclosures in order to obtain azimuth readings in real-time and adjust the antenna mountings accordingly.

A significant disadvantage associated with the aforementioned and other previous antenna alignment methods involved their inability to continuously monitor alignment and detect conditions of misalignment. Cell towers and other structures are susceptible to distortion and antenna deflection from various causes, such as weather, geological and impact forces, all of which can cause antenna misalignment. For example, after a major storm, cell towers and other antenna installations in an entire region may be affected and may be susceptible to performance degradation. Accordingly, an antenna alignment system should not only facilitate initial azimuth alignment, but also facilitate ongoing alignment monitoring and detecting conditions of misalignment, which can significantly deteriorate signal quality. Moreover, a permanent antenna alignment system should be contained primarily within existing equipment enclosures, such as the telecommunications antenna enclosures, because stringent regulatory requirements and approval procedures apply to equipment and components mounted exteriorly on transmission towers.

Heretofore there has not been available an antenna alignment system and method with the advantages and features of the present invention.

SUMMARY OF THE INVENTION

In the practice of an aspect of the present invention, a system and method are provided for aligning and monitoring telecommunications antennas using GNSS (GPS) signals. The system includes multiple pairs of GNSS antennas, each pair being mounted in a predetermined, spaced relationship on a printed circuit board (PCB), which is preferably permanently installed within the telecommunications antenna enclosure. The signals received by the GNSS antennas are used to compute by triangulation the GNSS antenna positions. A common receiver, which can be mounted on the transmission tower or other structure, receives inputs from the GNSS antenna pairs in a predetermined sequence via an RF switch. The transmission antenna orientations can be initially aligned with predetermined azimuth and continuously monitored thereafter for maximum performance. In the practice of an aspect of the method of the present invention, a transmission tower or other structure is equipped with multiple telecommunications antennas in standard enclosures. The antenna azimuth alignments are initially set and later monitored by triangulating GNSS signals received by the GNSS antenna pairs within the telecommunications antenna enclosures. A controller sequentially switches among inputs from the multiple antenna pairs to a common receiver.

BRIEF DESCRIPTION OF THE DRAWINGS

FIG. 1A is an upper, perspective view of the transmission tower with multiple telecom antennas.

FIG. 1B is an upper, perspective view of a printed circuit board (PCB) with a pair of GNSS antennas.

DETAILED DESCRIPTION OF THE PREFERRED EMBODIMENTS

I. Introduction and Environment

Figure 1:
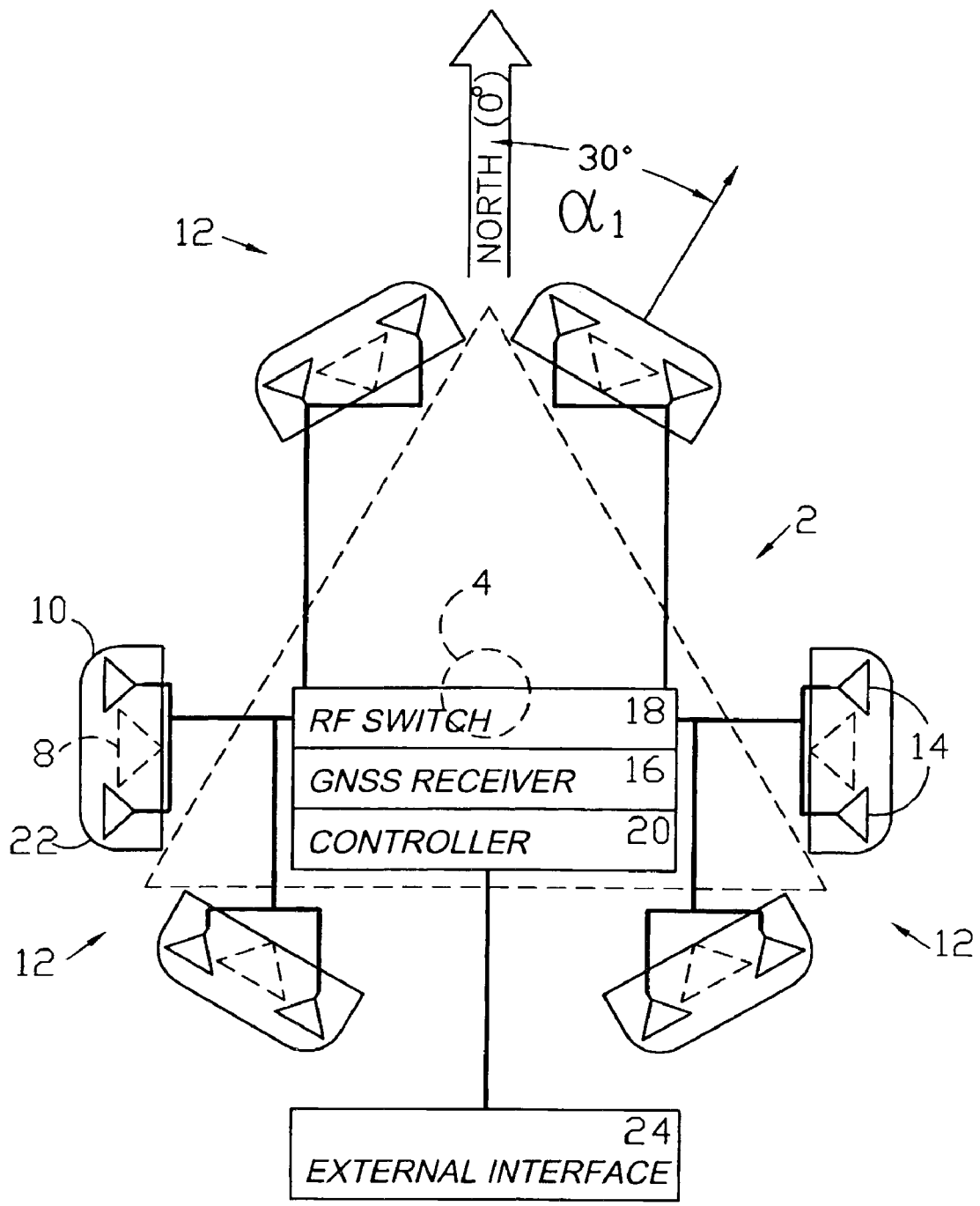
FIG. 1 is a block diagram of a transmission tower equipped with multiple telecom antennas and an antenna alignment system embodying an aspect of the present invention.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, up, down, front, back, right and left refer to the invention as oriented in the view being referred to. The words "inwardly" and "outwardly" refer to directions toward and away from, respectively, the geometric center of the embodiment being described and designated parts thereof. Global navigation satellite systems (GNSS) are broadly defined to include GPS (U.S.), Galileo (proposed), GLONASS (Russia), Beidou (China), Compass (proposed), IRNSS (India, proposed), QZSS (Japan, proposed) and other current and future positioning technologies using signals from satellites, with or without augmentation from terrestrial sources. Satellite-based augmentation systems (SBAS) are commonly used for improving GNSS accuracy and include the government-sponsored wide area augmentation system (WAAS, U.S.) and private subscription-based augmentation services, such as Omnistar. Said terminology will include the words specifically mentioned, derivatives thereof and words of similar meaning.

II. Preferred Aspect Antenna Alignment System 2

Referring to the drawings in more detail, the reference numeral 2 generally designates an antenna alignment system embodying an aspect of the present invention. Without limitation on the useful applications of the present invention, the system 2 is shown installed in a transmission tower 4 mounting upper and lower arrays 6, 7 of telecommunications antennas 8. The upper antenna array 6 as shown includes six telecom antennas 8 oriented at approximately 60° radial intervals with respect to each other for broadcasting signals in a combined 360° distribution pattern. The lower antenna array 7 includes three telecom antennas 8 oriented at approximately 120° radial intervals. Applications of the system 2 include other antenna array configurations, individual antennas, microwave antennas and other applications involving alignment and alignment monitoring. Each antenna 8 includes an elongated enclosure 10, which houses the actual telecommunications antenna elements and related system components.

The alignment system 2 generally comprises multiple pairs 12 of GNSS antennas 14, a common GNSS receiver 16, an RF switch 18 selectively connecting the antennas 14 to the receiver 16 and a controller 20 connected to the receiver 16. An external interface 24 is connected to the controller 20 and provides a suitable interface with, for example, a control center.

Each antenna pair 12 is mounted on a printed circuit board (PCB) 22, which is permanently located in a respective telecommunications antenna enclosure 10, at its upper end for a clear sky view. Mounting the GNSS antennas 14 in pairs 12 on common PCBs 22 facilitates relatively precise spacing therebetween (FIG. 1B) and with respect to the antenna enclosure 10 for azimuth determination using triangulation with the GNSS satellite constellation. More specifically, both GNSS antennas 14 are in the same horizontal plane (i.e., they have the same Z values of their XYZ GNSS-defined positions) and have slightly different XY position values. Calculating the differences between the XY positions and taking into account the GNSS antenna 14 spacing provides an azimuth $\alpha$ with respect to a reference direction, such as true north (i.e., 0°). The target azimuth $\alpha$ generally corresponds to a desired orientation, alignment or heading of the telecommunications antenna 8 for optimum telecommunications signal transmitting and/or receiving.

III. Preferred Aspect Antenna Alignment Method

Figure 2:
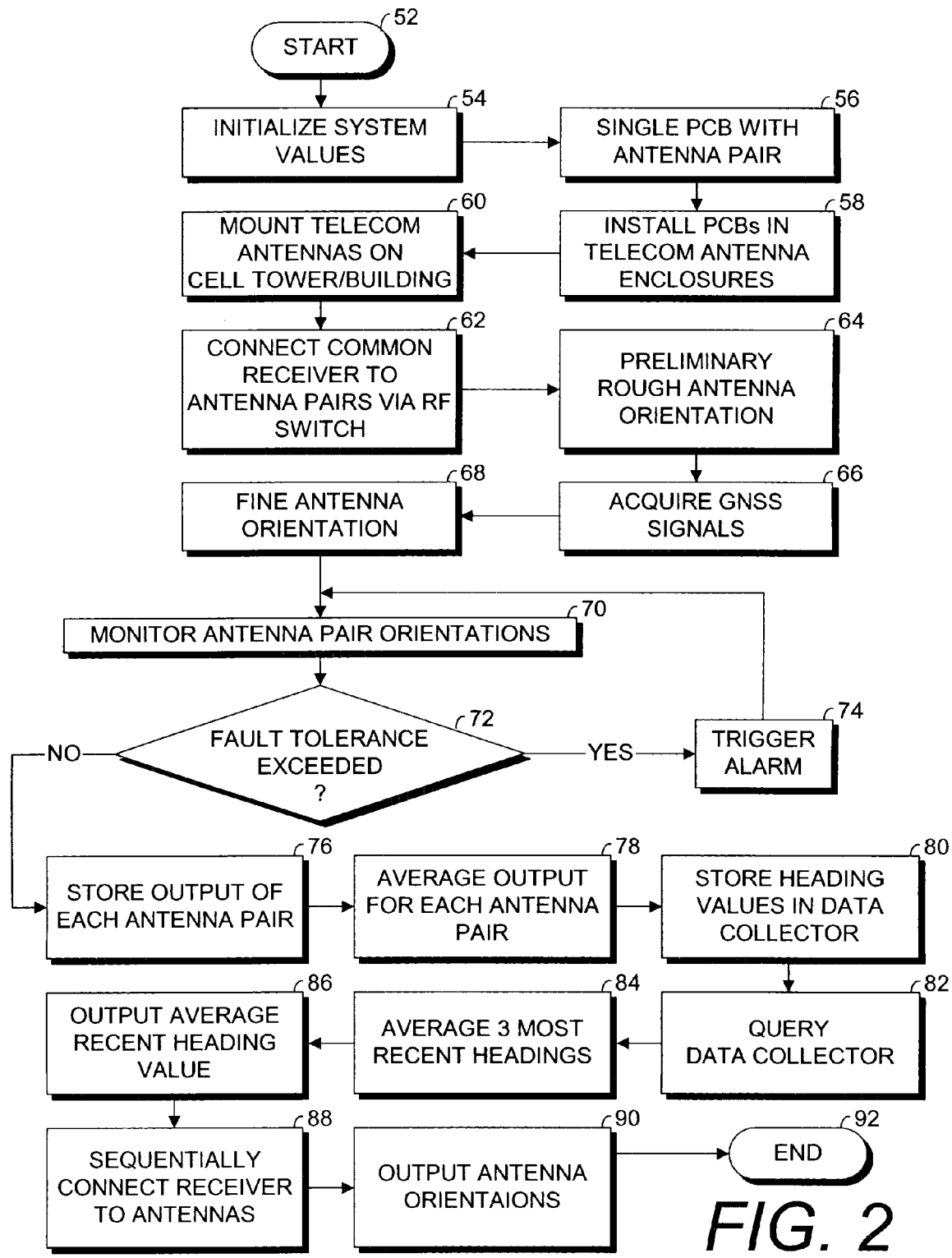
FIG. 2 is a flowchart of an antenna alignment method embodying an aspect of the method of the present invention.

FIG. 2 shows an antenna alignment method embodying an aspect of the method of the present invention. From a start 52, the method initializes system values at 54, which can be preprogrammed and include such operating parameters as a fault tolerance and external interface functions for transmitting data from the system 2 to a control center via the Internet (worldwide web), or some other suitable communications network or system, such as a WAN, a LAN, RF or a secure line. At step 56 single PCBs 22 are manufactured with GNSS antennas, which are preferably spaced at a known dimension, which is used for calculating the GNSS antenna 8 azimuth $\alpha$. At step 58 the PCBs 22 are installed in the telecom antenna enclosures 10, whereafter the telecom antennas 8 are mounted on the tower 4 at step 60. The GNSS antenna 14 pairs 12 are connected to a GNSS receiver 16 via an RF switch 18 at step 62 and a preliminary rough antenna orientation is made at step 64. Such an initial alignment can be accomplished by visual inspection, with surveying tools, with a compass or with other suitable equipment. At step 66 GNSS signals are acquired by the GNSS antennas 14 and provide inputs to the GNSS receiver 16 via the RF switch 18. Fine telecom antenna 8 orientation is accomplished with the GNSS signals at step 68.

During normal operation of the system 2, the controller 20 monitors the GNSS-derived alignment of the telecom antenna 8 azimuth angles $\alpha$ at step 70 using well-known triangulation methods for determining the azimuth angle $\alpha$ based on the relative XY position differentials of the GNSS antennas 14, which are substantially coplanar in a horizontal plane whereby the Z (height) values can generally be ignored in the simpler 2D alignment method. For 3D alignment, for example including altitude, an additional GNSS antenna 14 can be provided.

At decision box 72 the system determines if a predetermined fault tolerance has been exceeded, with an affirmative decision leading to a trigger alarm step at 74, e.g., signaling an operator at a remote location, such as a control center, that one or more of the telecom antennas 8 is misaligned. Such misalignment can be the result of various forces, including weather, geophysical or impact. A negative decision leads to storing the output of each antenna pair at 76, whereafter the average of the outputs for each antenna pair is calculated at 78 and the heading (i.e. azimuth angle) values are stored in a data collector at step 80. When the data collector is queried at 82, e.g., to verify the heading/azimuth angle of a telecom antenna numeral 8, a predetermined number of the most recent headings (e.g., three) are averaged at 84 and the average recent heading value is output at 86. The receiver 16 is sequentially connected to the GNSS antennas 14 at step 88 and the telecom antenna orientations are output at 90, whereafter the method ends at 92.

The output of the system 2 can be used for creating a service record for a particular telecom antenna array 6 or a particular tower 4. Thus, the operators can document the alignments of the telecom antennas 8 over time periods. Such monitoring can be useful for showing a continuous level of telecommunications service quality, and also for troubleshooting and maintenance operations.

It is to be understood that the invention can be embodied in various forms, and is not to be limited to the examples discussed above.

Having thus described the invention, what is claimed as new and desired to be secured by Letters Patent is:

1. A system comprising the use of global navigation satellite system (GNSS) antennas for aligning and monitoring a plurality of directional antennas adapted for directionally transmitting and/or receiving signals and including an enclosure, and adapted for mounting multiple said directional antennas in radially-spaced relation on a directional antenna tower, which system includes:
   a plurality of directional antenna enclosures;
   said directional antenna enclosures being elongated with upper and lower ends and including a generally vertical operating position;
   a plurality of directional antennas;
   a pair of GNSS antennas fixedly attached to each of said directional antenna enclosures;
   a plurality of printed circuit boards (PCB) of a predetermined size, wherein each of said pair of GNSS antennas is mounted to a PCB in a predetermined spacing;
   each of said PCB and GNSS antennas being fixedly mounted in one of said directional antenna enclosures with respect to each directional antenna's direction of transmission/reception;
   an upper array comprising six directional antenna enclosures mounted in radially-spaced, horizontally co-planar relation on said directional antenna tower and mounted generally toward the top of said directional antenna tower, said upper array comprises directional antenna enclosures oriented at approximately 60° with respect to each other;
   a lower array comprising a predetermined number of directional antenna enclosures mounted in a radially-spaced, horizontally co-planar relation on said directional antenna tower and mounted generally below said upper array, said lower array comprises three directional antenna enclosures oriented at approximately 120° with respect to each other;
   a global navigation satellite system (GNSS) receiver;
   a controller connected to said GNSS receiver and adapted for processing GNSS signals for determining the GNSS antennas' GNSS-defined locations and thereby determining the directional antenna's direction;
   a switch adapted for selectively and sequentially connecting respective GNSS antenna pairs to said receiver, said receiver being adapted for cycling through said GNSS antenna pairs to determine an initial alignment and for continued subsequent monitoring of each antenna pair; and
   a processor adapted for determining a horizontal directional alignment of each said directional antenna and for providing an output corresponding to each said directional antenna horizontal directional alignment.

2. A global navigation satellite system (GNSS)-based device for aligning and monitoring the alignment of multiple, directional telecommunications antennas forming an array of directional telecommunications antennas mounted on a telecommunications antenna support structure, each said directional antenna including an enclosure with upper and lower ends and a generally vertical operating position, each said directional antenna further including an azimuth-adjustable mounting on said antennas support structure, which system comprises:
   multiple GNSS-based alignment antenna pairs each located in a respective directional antenna enclosure and including multiple GNSS antennas;
   said GNSS antennas in each said alignment antenna pair being located in a predetermined spacing and in fixed relation to a respective corresponding directional telecommunications antenna in a respective antenna enclosure;
   a GNSS receiver;
   a radio frequency (RF) switch connected to said alignment antenna pairs and to said GNSS receiver, said switch being adapted for sequentially and individually providing input to said GNSS receiver from said alignment antenna pairs;
   a microprocessor connected to said GNSS receiver and adapted for computing a directional alignment of each said alignment antenna pair and a corresponding directional telecommunications antenna in a respective antenna enclosure;
   an external interface connected to said microprocessor and adapted for interfacing said telecommunications antenna alignment pair with an entity monitoring said directional telecommunications antenna alignment.

3. The device according to claim 2, which includes:
   said directional telecommunications antenna array comprising a first directional telecommunications antenna array;
   a second directional telecommunications antenna array mounted on said support structure in vertically-spaced relation relative to said first rational telecommunications antenna array;
   said second directional telecommunications antenna array comprising multiple, directional telecommunications antennas each including a directional antenna enclosure with upper and lower ends and a generally vertical operating position, each said directional telecommunications antenna further including an azimuth-adjustable mounting on said antennas support structure;
   multiple GNSS-based alignment antenna pairs each located in a respective corresponding second directional telecommunications antenna enclosure and including multiple GNSS antennas;
   said GNSS antennas in each said alignment antenna pair being located in a predetermined spacing and in fixed relation to a respective corresponding second directional telecommunications antenna in a respective directional antenna enclosure; and
   said radio frequency (RF) switch being connected to said alignment antenna pairs in said second directional telecommunications antenna pair and to said GNSS receiver, said switch being adapted for sequentially and individually providing input to said GNSS receiver from said alignment antenna pairs.

4. The device according to claim 3, which includes:
   multiple printed circuit boards (PCB) of a predetermined size, each mounting a pair of said GNSS antennas in a predetermined spacing.

5. The device according to claim 3, which includes:
   said first telecommunications array comprising an upper array including six telecommunications antennas mounted in radially-spaced, horizontally co-planar relation on said directional antenna and mounted generally toward the top of said directional antenna, oriented at approximately 60° with respect to each other; and
   said second telecommunications array comprising a lower array including three telecommunications antennas mounted in a radially-spaced, horizontally co-planar relation on said directional antenna and mounted generally below said upper array, oriented at approximately 120° with respect to each other.

6. The device according to claim 3, which includes:
said RF switch being adapted for selectively and sequentially connecting respective GNSS antennas to said receiver; and
said receiver being adapted for cycling through said GNSS antenna pairs to determine an initial alignment and for continued subsequent monitoring of each antenna pairs.

7. The device according to claim 3, which includes said microprocessor being adapted for determining a horizontal directional alignment of each said directional antenna and for providing an output corresponding to each said directional antenna horizontal directional alignment.

* * * * *